Oct. 14, 1924.
R. HORTON
ICE PLANT
Filed Jan. 19, 1921 5 Sheets-Sheet 2
1,511,219
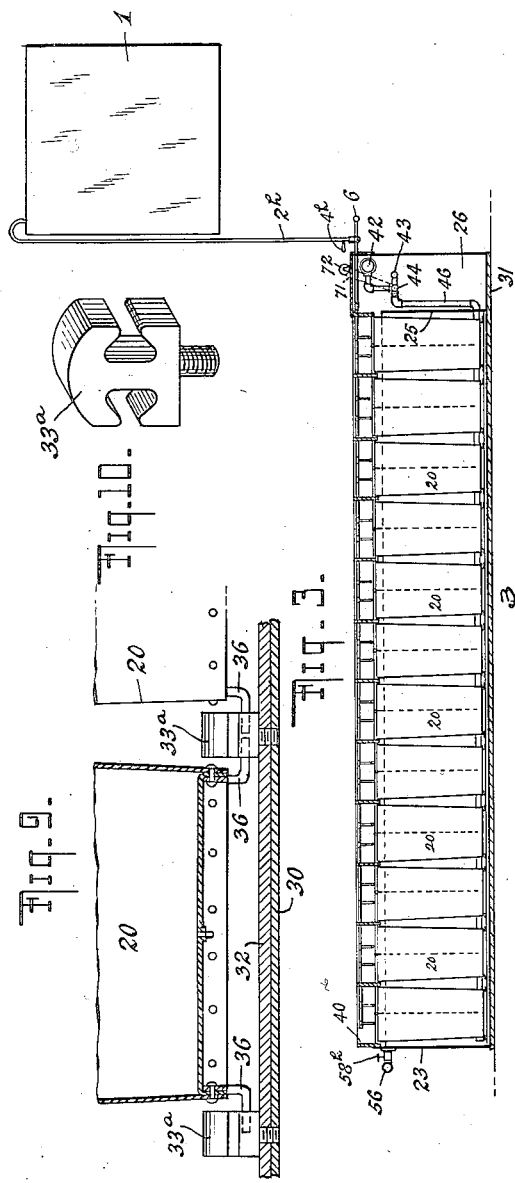
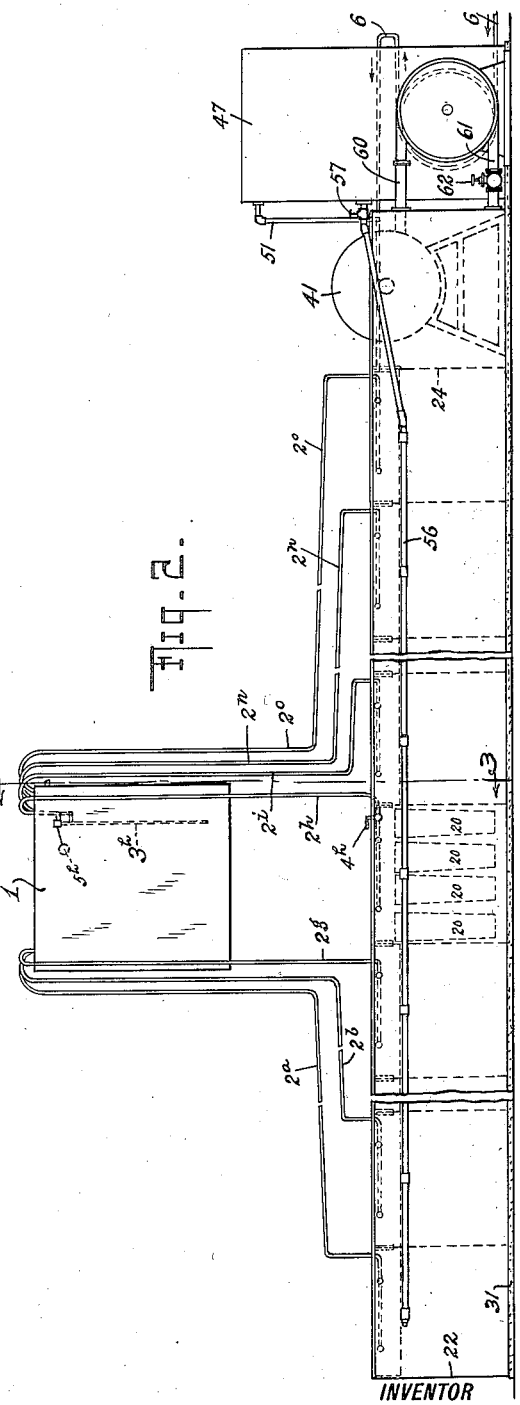
WITNESS:
G. V. Rasmussen
INVENTOR
RALPH HORTON
BY
Briesen & Schrenk
ATTORNEYS Oct. 14, 1924.
R. HORTON
ICE PLANT
Filed Jan. 19, 1921
1,511,219
5 Sheets-Sheet 3
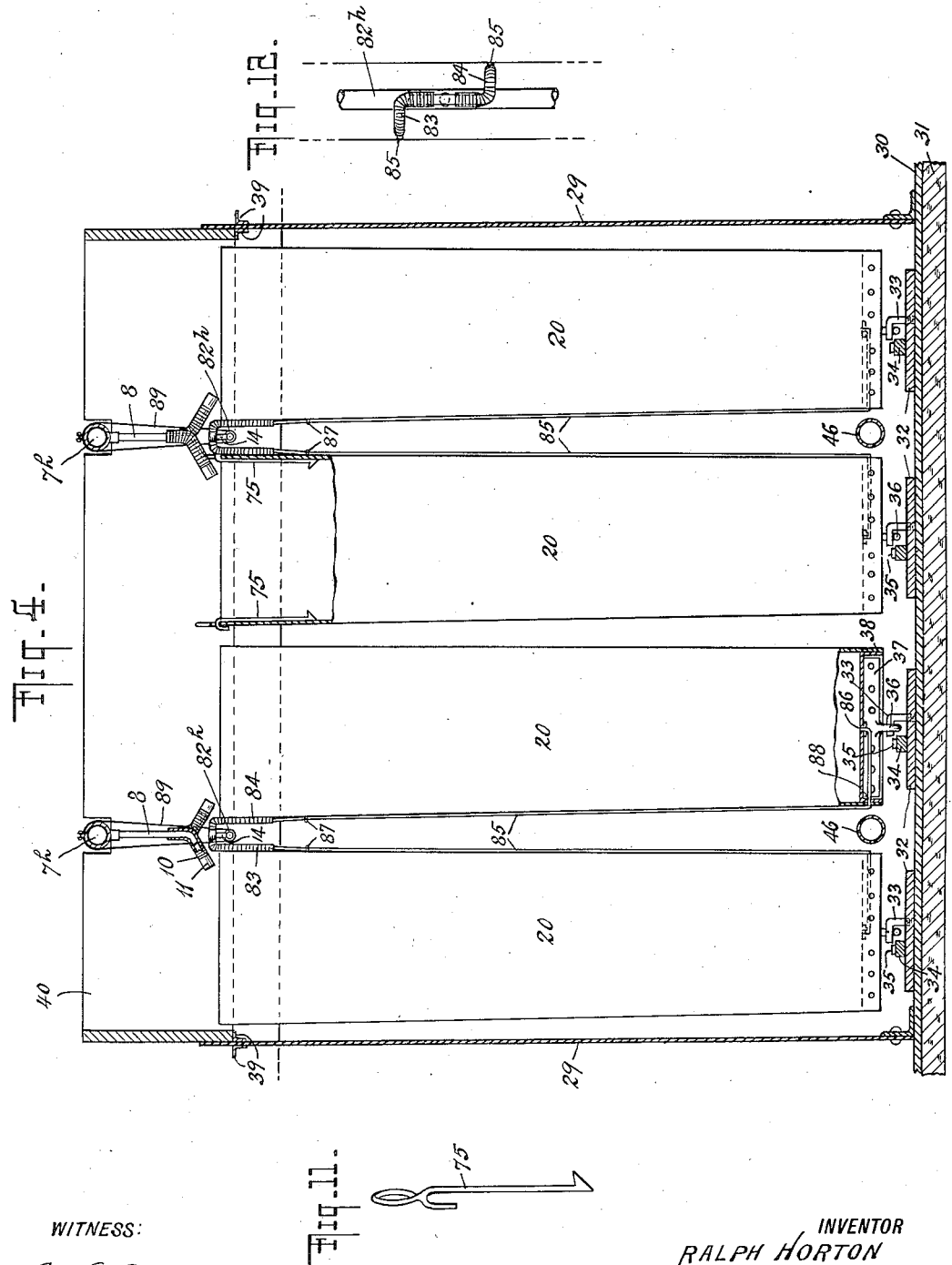
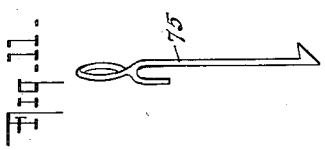
WITNESS:
G. V. Rasmussen
INVENTOR
RALPH HORTON
BY
Briesen & Schrenk
ATTORNEYS

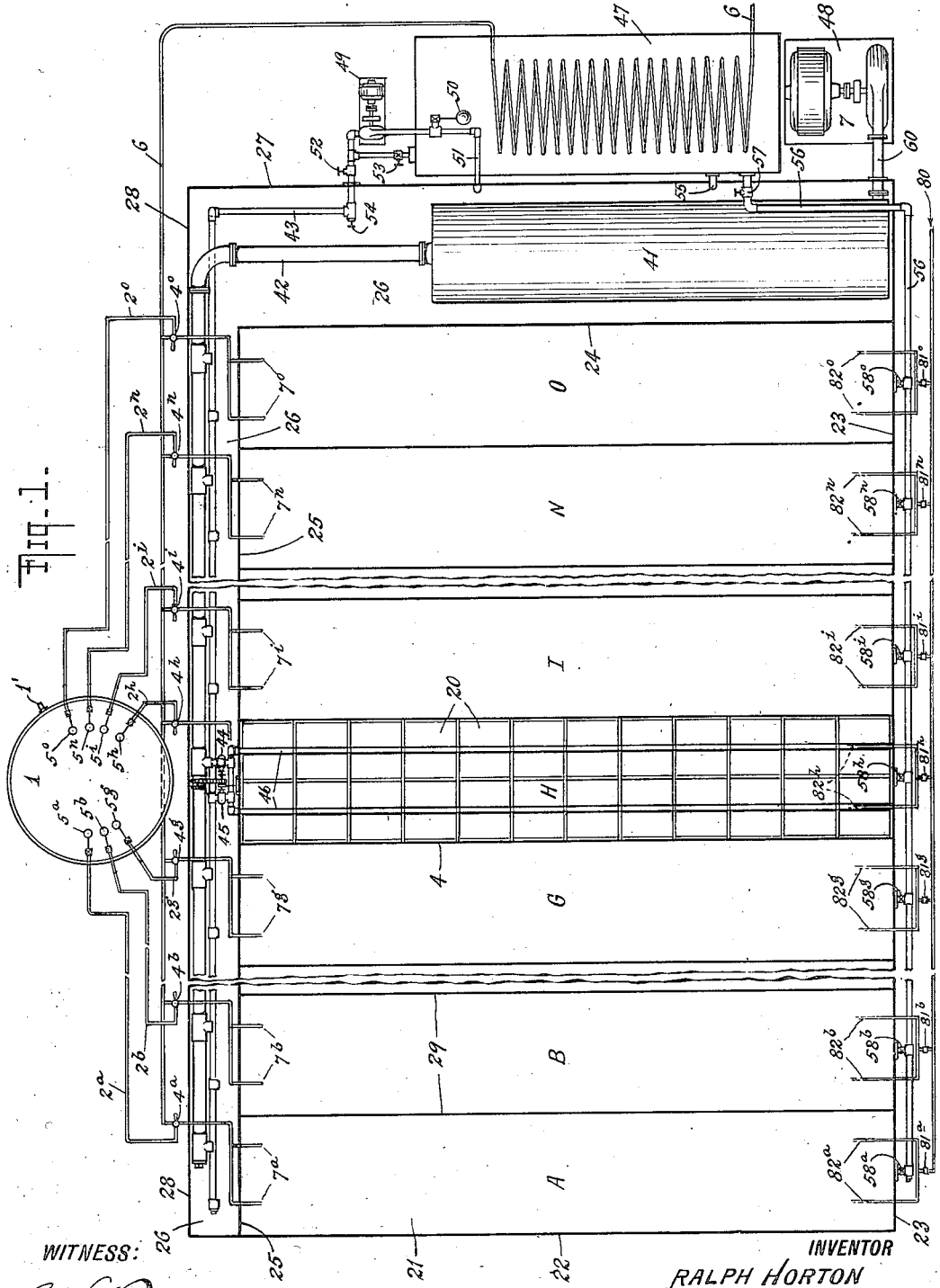

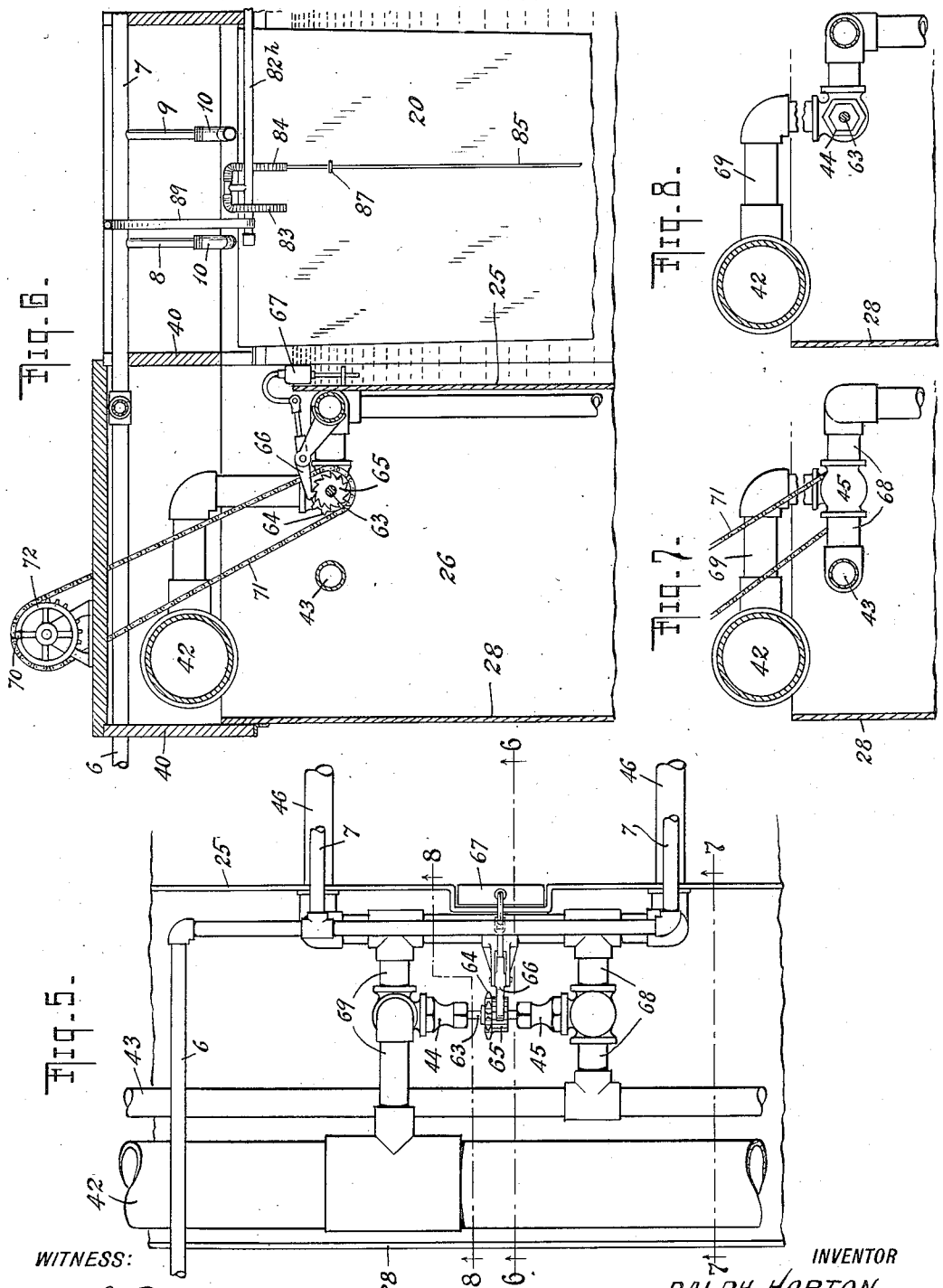

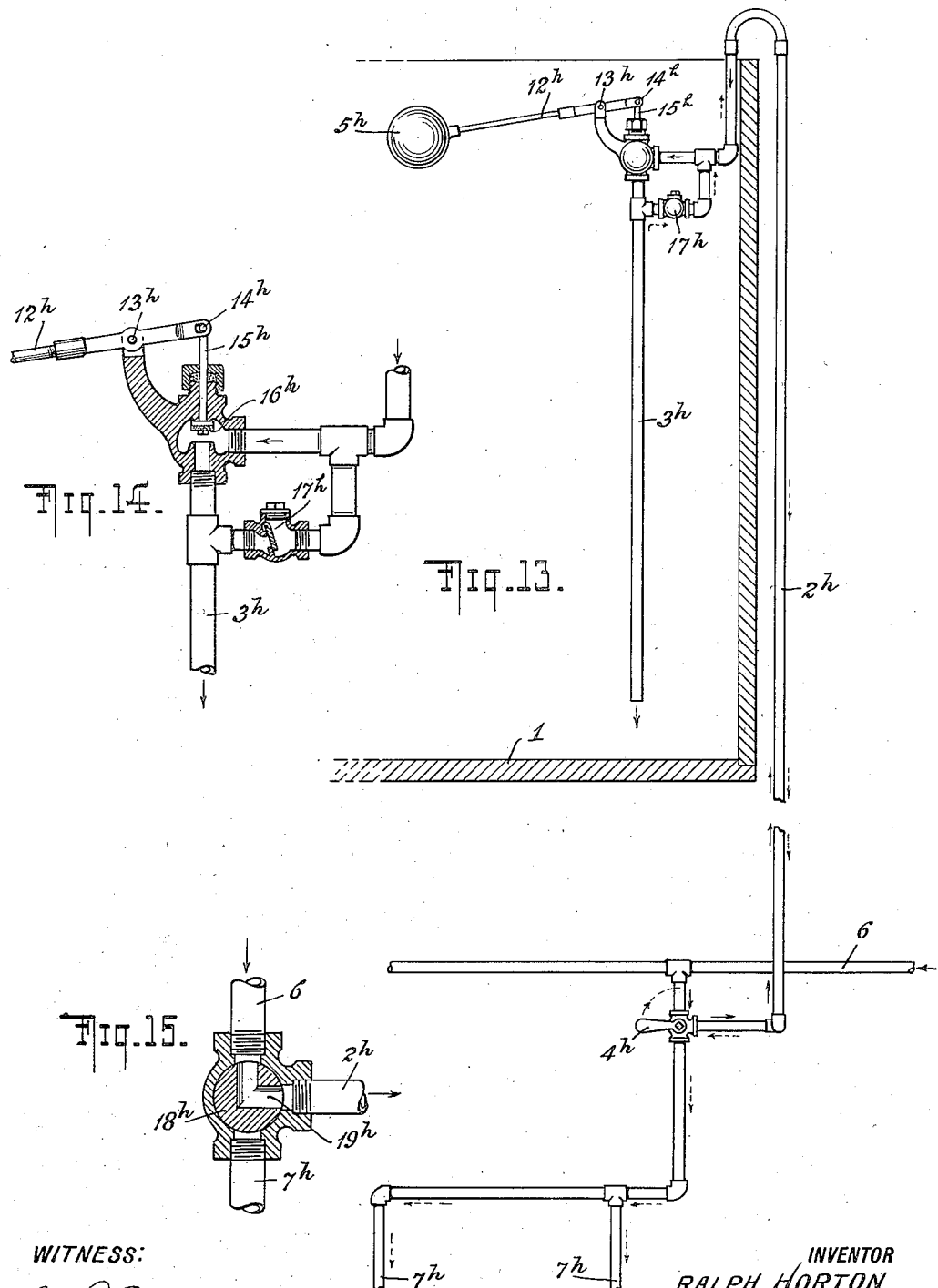

Patented Oct. 14, 1924.

1,511,219

UNITED STATES PATENT OFFICE.

RALPH HORTON, OF NEW YORK, N. Y.

ICE PLANT.

Application filed January 19, 1921. Serial No. 438,279.

*To all whom it may concern:*

Be it known that I, RALPH HORTON, a citizen of the United States, and resident of New York, N. Y., have invented certain new and useful Improvements in Ice Plants, of which the following is a specification.

This invention relates to refrigerating systems and particularly to improvements in ice plants and apparatus used therein.

In the manufacture of ice, the water to be frozen is contained in cans of appropriate size, and a large number of such cans are enclosed within a tank. The spaces between the cans are filled with cold brine to freeze the water, and after the termination of the freezing process, the cans are lifted out of the tank and exposed to heat. When the cakes of ice are sufficiently thawed from the sides of the cans, they are lifted out and the latter are replaced into the tank.

In order to obviate the necessity of lifting out the cans, it has been suggested that the cans be permanently fastened to the bottom of the tank, and that the thawing of the ice be performed within the tank by withdrawing the cold brine therefrom and replacing it with warm brine. The drawbacks of such arrangements are manifold. The cans being rigidly connected with the tank, great care must be exercised in pulling out the ice, because otherwise the cans and tank might be injured. The cans being rigidly held in a vertical position the ice cannot be pulled out of more than one or two cans at a time, whereas in the above mentioned system, a large number of cans may be lifted simultaneously. A further drawback of this system is that the removal of injured cans is a rather prolonged and expensive operation.

In prior systems, the filling of the cans with water is accomplished by a workman passing a hose from one can to the other, the water being supplied to the hose direct from the outside source of supply. To increase the speed at which the cans are filled, automatic water supply systems have been suggested, but the connections of the water pipes to the cans were of a permanently fixed nature and the conduits were located below the tank. This increases the cost of installation and necessitates the elevation of the tank from the floor of the building so as to render the pipes accessible. The elevation of the tank involves not only additional cost over the removable can systems but results also in loss of space and makes impossible the heat insulation of the bottom of the tank.

For the purpose of obtaining clear ice, air is blown through the water to be frozen. In the systems of the prior art, the air supply pipes either projected into the ice, necessitating their removal before the ice could be pulled out, or the air pipes were laid within a space located below the tank, necessitating the elevation of the latter with the resulting disadvantages.

Attempts have been made to attach the air pipes to the cans, but due to the changes in temperature, the air pipes were frequently broken and in systems of the detachable can type, the attendant frequently neglects properly to adjust the air connections.

The brine for freezing the water is either cooled and agitated within the ice making tank or forced to circulate through the tank and a separate brine cooler. The former system necessitates the removal of the water cans for the thawing out of the ice, and in the systems of the latter type, the thawing out of the ice is accomplished by heating the cold brine. The loss of energy resulting from this is quite obvious and needs no further elaboration. In these systems a single brine circulating system is provided, and in addition to the mentioned loss of energy there are further disadvantages consisting in a relatively lengthy thawing out operation and the cracking of ice due to fluctuations of temperature.

It is the object of the present invention to produce a plant for the manufacture of ice in which the advantages of both systems (removable and fixed can systems) are present without any of their drawbacks. In a plant constructed in accordance with the present invention, a large number of cakes of ice may be simultaneously lifted out of the cans without injury to the latter and without the necessity of lifting the cans out of the tank. A plurality of cans are simultaneously and automatically filled with water, and an improved freezing and thawing process and apparatus and an improved arrangement for blowing air through the water is provided, but an elevation of the tank from the floor of the building is not necessary. In case of repairs the cans are readily removable from the tank, and furthermore, the brine circulating system is not subject to continuous fluctuations in temperature.

With this object in view, according to one of the features of the present invention the cans are maintained within the tank but are movable relatively thereto within certain predetermined limits. The cans, when empty are permitted to rise to a point below their floating level. The buoyant force of the empty cans is prevented from having an injurious effect on the tank bottom by reason of the fact that the brine or other freezing medium employed is caused to produce a relatively large hydrostatic pressure on the tank bottom by having it cover a large area thereof. Preferably the cans are attached to the tank, the connection being such that upon the pulling of the cake of ice, the can will assume a position in the direction in which the strain is exerted, all side strain on the can being avoided thereby. A further means to prevent injury to the can is that the coupling is arranged to permit the movement of the can with the crane to a certain distance. This upward movement is suddenly interrupted, whereby the ice will be jarred loose and less force will be sufficient to detach the ice than if the can were rigidly held in a position. The coupling is so arranged that, when the removal of a can is desired, this may be effected without disturbing the ensemble as a whole.

According to another feature of the invention, the cans are automatically filled with water, none of the water pipes being located below the tank. In the present embodiment of the invention, this is accomplished by maintaining in a cistern just sufficient water for the filling of all or a certain group of cans, and conducting this water, when released, through a relatively thick pipe towards the cans, and from this pipe through relatively thin pipes direct to the cans, both pipes being out of contact with the cans. Due to the relative resistances of the thick and thin pipes, no water will flow through the latter until the former is completely filled, whereby the filling of the cans is simultaneously started irrespective of their distance from the cistern. As a result of this, the simultaneous filling of the cans without overflow is insured by the volume water in the cistern.

Still another feature of the invention has to do with the means of obtaining clear ice. De-humidified air is blown through the water and is conducted to the cans by a flexible tube guided on the wall of the can, but no part of the tube projects within the ice or the container. This arrangement permits the use of a relatively movable can, obviates the necessity of detaching the air pipes, and prevents the breakage of pipes due to changes in temperatures, the pipes being free to expand and contract.

According to a further feature of the invention, the freezing and thawing material, such as cold and warm brine, is circulated through the tank and separate cold and warm brine containers. In order to avoid loss of energy resulting from the warming of the cold brine, separate warm and cold brine containers are provided, the circulation of the warm brine through the tank being started subsequent to the removal of the cold brine from the tank and vice versa.

In the drawings, Fig. 1 is a top view of an ice plant embodying the various features of the present invention; Fig. 2 is a side view of the plant, partly in section; Fig. 3 is a sectional view along lines 3, 3 of Fig. 2; Fig. 4 is a side view of four cans; Fig. 5 is an enlarged view of a part of the piping arrangement illustrated in Fig. 1; Figs. 6, 7 and 8 are sectional views along lines 6, 7 and 8 respectively of Fig. 5; Figs. 9 and 10 show a modified arrangement of connections between a can and the bottom of the tank; Fig. 11 illustrates an ice hook; Fig. 12 illustrates the air pipe connections; and Figs. 13, 14 and 15 show the details of the water pipe connections.

The water to be frozen into ice cakes is collected in a cistern or tank 1, to be siphoned therefrom into cans provided at a lower level than the cistern. The capacity of the cistern is equal to the total capacity of the cans located within a single section of the tank, i. e., the cans that are to be filled at the same time. Water from an outside source of supply is conducted through a pipe 6, and under the control of any one of a plurality of three-way cocks 4 (one for each group of cans), the cistern 1 may be filled with water to a height controlled by floats 5 and an overflow 1'. Tubes 3 (one for each section of the tank) project into the cistern to different depths determined by the relative distances between cistern and the various groups of cans. 7 are water headers positioned above the cans. The cans 20 are positioned within a tank 21, and the latter is subdivided into sections A, B, etc. O by means of partition walls 29. The wall 25 of the tank is lower than the walls 22, 23 and 24. Adjacent to the wall 25 is a trough 26 extending to the full length thereof and as high as the side walls 22, 23 and 24 of the tank. A vessel or shell 41 provided above the trough 26 contains brine and the usual cooling apparatus, and a centrifugal pump 48 may discharge cold brine from shell 41 through a pipe 42 into any desired section of the tank 21. The brine contents of any section may be emptied through a pipe 43 to which a centrifugal pump 49 is connected. Pipes like 46 provided with suitable openings extend near the bottom of each section of the tank, valves 44 and 45 controlling the connection between pipes 46 and 42 and 43. One set of valves 44 and 45 and associated apparatus is provided adjacent to each section. The thawing out of the ice cakes is accomplished by means of warm brine obtained from a tank 47 through a pipe 56.

For the purpose of obtaining clear ice dehumidified air is blown through the water. The air conduits are indicated at 80 and 82, the former connecting with a suitable air compressor (not shown).

The cans 20 are attached to the bottom plate 30 of the tank by means of hooks 36 riveted to a reinforcing bar or flange 38 surrounding the bottom of the can. These hooks 36 engage co-operating hooks 33 screwed into plates 32 welded to the bottom plate 30 of the tank. In order to prevent the hook 36 from disengaging hook 33, a stop member in the form of a bar 34 extending along the open sides of all the hooks 33 is provided in a row and screwed to the plate 32 by means of screws 35. If at any time it is desired to remove a can 20, the screw 35 is unscrewed by inserting a screw driver through the space separating the individual cans, unscrewing screw 35 and slightly displacing the bar 34. As shown in Fig. 9, each can is provided with two hooks 36. The plates 32 and the bars 34 extend the complete width of the tank.

The tank is insulated from the floor of the building by a layer of cork 31.

The other details of the construction will be set forth in connection with the following description of the operation of this system.

Assuming that the water cistern 1 is empty and it is desired to make ice in section H of the tank, the valve $18^h$ (Fig. 15) forming part of the three-way cock $4^h$ is rotated in a manner to permit water to flow from the outside source of supply through pipes 6, $2^h$ and $3^h$ into the cistern 1. When the water in the cistern reaches the desired height, float $5^h$ (Fig. 13) rises and, through the agency of an arm $12^h$ pivoted at $13^h$, the plunger $15^h$ pivoted to arm $12^h$ at $15^h$ is forced to descend. A valve $16^h$ carried by the plunger $15^h$ closes the opening of pipe $3^h$ and prevents the further flow of water. When the cistern is full the attendant rotates the three-way cock $4^h$ to move valve $18^h$ into a position in which water is siphoned from cistern 1 through pipe $3^h$, past a check valve $17^h$, and then through the pipes $2^h$ and $7^h$, the latter resting on wooden blocks 40 positioned between adjacent rows of cans 20 and resting on angles 39 provided on the partition walls 29. The water headers $7^h$ are of a larger diameter than the pipes 8 and 9 and the brass bushings 11 provided at the ends of the rubber hose pulled over the bent ends of the pipes 8 and 9. When the headers $7^h$ are full, water is discharged simultaneously through all the pipes 8 and 9, the rubber extension 10 and through the apertures in the bushings 11 into the cans 20.

The apertures provided in the bushings 11 overhanging the cans 20 within a section are preferably graduated in size so as further to insure equalization of the water flow into all the cans. In this manner, all the cans 20 within section H are simultaneously filled with an approximately equal predetermined amount of water without the necessity of any human supervision.

The pipes 3 individual to the various sections of the tank, project into the cistern and, depending on the distance of the tank section from the cistern, may terminate at different distances from the bottom of the latter. In this manner, the length of the water piping between the cistern and the tank sections is compensated, and each group of cans receives the correct volume of water. By adjusting the depth of one or more of these pipes 3 variations in the number or groupings of the cans can readily be taken care of. While water is flowing from the cistern into the cans no water can flow from pipe 6 into the cistern or from the water main into the cans. The arrangement is such that water can never, except through the intervention of the siphons, flow from the main into the can supplying pipes. Before the operator can fill the next section of the tank from the cistern, he must first throw the valve 18 which governs that particular tank section, first to fill the cistern and then to empty it.

The attendant rotates now by means of a handle 70, a wheel 72 supported on a stand provided on top of the trough covering. In response to a counterclockwise rotation of the wheel 72, a chain 71 revolves with it and transmits the motion to a sprocket wheel 64 provided on a shaft 63 common to the valves 44 and 45. The valve 44 is in a pipe 69 leading to the brine discharge pipe 42, and valve 45 is in a pipe 68 leading to the brine withdrawing pipe 43. The valves are so positioned that in response to a counterclockwise rotation of the shaft 63, the valve 44 is opened and the valve 45 closed, and in response to a clockwise rotation of the shaft 63, the valve 44 is closed and the valve 45 opened. When the valve 44 is opened, the centrifugal pump 48 forces the discharge of cold brine from shell 41 through pipe 42, and then through pipes 69 and 46 into the section H of the tank. The cold brine rises in section H of the tank but cannot flow into the cans 20 because the upper wall 25 of tank is lower than the cans. The valve 62 (Fig. 2) is maintained open during the freezing operation and the cold brine that overflows into the trough 26 is sucked out of the latter by pump 48 and forced back into the cooling shell 41. In this manner a continuous flow of cold brine is maintained around the cans 20. The brine level in the tank is obviously limited by and maintained at the height or upper edge of the wall 25 which is indicated by the dotted line in Fig. 2.

While the water is being frozen dehumidified air is blown through the pipe 80, the air pipes 82$^h$ supported from the water headers 7$^h$ by means of straps 89, and flexible copper tubes 85 guided along the walls of the cans through rings 87 and leading through an aperture 88 of the flange 38 to an aperture 86 in the bottom plate of the cans 20. The air is delivered under proper pressure (usually 15 lbs.) and maintains the water in agitation. As the water freezes, the prongs of hooks 75 hanging on each can become embedded therein.

When the freezing process is completed, the wheel 72 is turned in a clockwise direction causing, through the agency of chain 71, sprocket wheel 64 and shaft 63 the closure of valve 44 and the opening of valve 45. The flow of cold brine is arrested and the brine contained in the tank is sucked out through pipes 46, 68 and 43, through the centrifugal pump 49 and a pipe 51 into the trough 26. This flow through pipe 51 is maintained while the warm brine tank 47 is full and a float 50 provided therein closes a discharge spout of pipe 60 leading to the warm brine tank. The pump 48 empties the contents of trough 26 into the shell 41.

As soon as the section H of tank 3 is empty, the attendant opens a valve 58$^h$ whereupon a predetermined amount of warm brine, just enough to fill H, flows from the tank 47 through the pipe 56 into section H of the tank faster than pump 49 will discharge. The warm brine flowing into the tank section is maintained in circulation through the tank, the pipes 46, 68 and 43, and the centrifugal pump 49 back to the warm brine tank, the float 50 having opened the discharge spout of pipe 51 as soon as brine was withdrawn from tank 47. This warm brine circulation is kept up until the ice is thawed out around its periphery to permit ready withdrawal from the cans. The ice is lifted out by means of an overhead crane of the air cylinder and plunger type, separate cylinders being provided for each cake to limit the pull on each cake to about 400 lbs., the hooks 75 being attached to a chain suspended from the crane. When the ice cake is being pulled from the can, the latter is permitted to rise until the hook 36 engages the hook 33, and the cans 20 are permitted to perform a swinging or horizontal motion within the limits of stop 34 and hook 33. Due to this arrangement, the ice cake will be more readily jarred loose from the sides of the can 20 and the cans from which ice is being pulled will assume a position in the direction in which the pull is exerted so as to avoid any side strain of the walls of the cans. Four cakes of ice may be simultaneously pulled by a single crane.

A modified arrangement of coupling the cans to the tank is illustrated in Figs. 9 and 10. The bars 34 are eliminated, the bent down ends of the hook 33$^a$ performing their function. When the tank is empty, the cans 20 will rest with their hooks 36 engaging the lower portion of the hook 33$^a$. When brine is discharged into the tank and the cans float, the hooks 36 engage the upper portion of 33$^a$. The bent down ends of hook 33$^a$ prevent the slipping out of hooks 36 in both positions of the can. In order to unhook the cans, all that is necessary is slightly to lift or lower the cans, depending whether or not the cans are floating, and then the hook 36 may be removed sideways between the tips of the hook 33$^a$. A single hook 33$^a$ serves for holding two adjacent cans.

It will be observed that except for the hooks or other attaching devices brine covers the entire bottom of the tank. This feature is of extreme importance inasmuch as the hydrostatic pressure of the brine is thereby made to participate in the proper functioning of the plant since it counteracts to the amount required, the tendency of all the cans to float and the force of the ice pulling plungers on the crane. So far as I am aware, the principle has never before been employed in ice plants and it is capable of application whether the cans are movable with respect to the bottom of the tank or are in fixed relation thereto, provided in each case the brine is permitted to cover enough space to more than equalize the upward pull of the cans when empty, the cans being at the same time held down within the tank by some stop, coupling or fixture.

It is not necessary to disturb the water connection while the ice cakes are being lifted out of the cans. The rubber extensions 10 readily yield passage to the ice and resume their normal position once they are cleared.

After the ice is lifted out of the cans, the attendant must first stop the warm brine flow and withdraw the warm brine before he can proceed with the filling of cold brine into the tank. Otherwise there would be a serious temperature loss. In order to prevent the attendant from opening the valve 44 while the valve 58$^h$ is open, a pawl 66 is provided which, under the control of a float 67 provided within a recess in section H of the tank, is forced into engagement with a ratchet wheel 65 fastened to the shaft 63. It will be seen, therefore, that while section H is full of brine, the pawl 66 will hold through the aid of ratchet 65 the shaft 63 from rotation in a counter-clockwise direction. Should the operator attempt to turn the wheel 60 in a counterclockwise direction, he will not be able to do so and will first close valve 58ʰ to stop the flow of warm brine whereupon section H will be emptied of its contents through pipe 43. The float 67 will now descend and the pawl 66 move out of engagement with wheel 65. The filling of the tank may proceed now in the above described manner.

A valve 54 provided in pipe 43 controls the passage of brine from trough 26 through pump 49. This valve is normally slightly open so as to prevent the pump 49 running dry. If for any reason it is desired to pump out the contents of tank 47, the valves 57 and 52 are closed, valve 53 opened, and the spout leading from pipe 51 into tank 47 closed. Under the action of pump 49 the contents of tank 47 are discharged into the tank 26.

The warm brine when thawing the cans, naturally cools down and is then warmed in tank 47 by the water passing through pipe 6, also cooling ammonia liquid before its expansion in brine cooler 41 thereby making a heat exchange which saves about 15% of energy required in present systems.

I claim:

1. In an ice-making plant, the combination of a tank, a can located therein and having its lower end spaced from the bottom of the tank, and having its entire lower end exposed to a liquid medium in the tank, said liquid medium creating a hydrostatic pressure upon the bottom of the tank sufficient to resist the upward buoyant force exerted by the liquid medium upon the can when empty and a connection between said can and said tank arranged in non-obstructive relation with reference to the removal of the ice block from the can while the can remains in the tank, said connection successively resisting first the pull incidental to the removal of the ice from the can and then the buoyant force exerted by the liquid upon the can after the ice has been removed therefrom and being free from upwardly directed strain when the can contains water to be frozen.

2. In an ice-making plant, the combination of a tank, a can located therein and having its lower end spaced from the bottom of the tank, and having its entire lower end exposed to a liquid medium in the tank, said liquid medium creating a hydrostatic pressure upon the bottom of the tank sufficient to resist the upward buoyant force exerted by the liquid medium upon the can when empty and a connection between said can and said tank arranged in non-obstructive relation with reference to the removal of the ice block from the can while the can remains in the tank, said connection successively resisting first the pull incidental to the removal of the ice from the can and then the buoyant force exerted by the liquid upon the can after the ice has been removed therefrom and being free from upwardly directed strain when the can contains water to be frozen, a tube for conveying dry air into the bottom of the can, said tube being wholly carried by the can, a dry air line and a constantly open connection between said line and the dry air tube, said air line connection and tube lying wholly outside of the path of removal of the ice.

3. In an ice-making plant, the combination of a tank, a can therein and co-operating devices on said can and said tank respectively, whereby the can is normally held in said tank, said devices being arranged in non-obstructive relation with reference to the removal of the ice block from the can while the can remains in the tank, said devices being capable of successively resisting the forces developed in the removal of the ice from said can and the buoyant force exerted by the liquid in the tank when the can is empty and being movable into a predetermined relation to each other different from any position assumed during the operation of making the ice and its removal, to permit intentional disconnection of the can from the tank.

4. In an ice-making plant, the combination of a tank, a can located therein and having its lower end spaced from the bottom of said tank, a connection between the said can and said tank arranged in non-obstructive relation with reference to the removal of the ice block from the can while the can remains in the tank whereby said can is constantly held in said tank and is permitted a freedom of movement relatively thereto within predetermined restricted limits, said connection serving as a thrust receiving element when the can is empty and the tank is full of fluid, a liquid medium in said tank having access to the space beneath said can and creating a hydrostatic pressure upon the bottom of said tank sufficient to resist the upward buoyant force exerted by the liquid upon the can, a tube for conducting dry air extending lengthwise of the can and leading into the lower part thereof and means whereby said air tube is connected with said can in a manner to cause it to partake of all movements of said can and to permit said tube to expand and contract under temperature variations independently of said can.

5. In an ice making plant, a tank, a can within said tank, means for limiting the vertical movement of said can within said tank, to a point lower than the floating level of the can when empty, but leaving said can free to swing and for restricting the swinging of said can within predetermined limits when in its lowermost and uppermost positions and permitting its removal from the tank when in another position.

6. In an ice making plant, a tank, a can within said tank, means for limiting the vertical movement of said can within said tank, means for limiting the horizontal movement of said can when in its lowermost and uppermost limited positions, and permitting the horizontal movement within the limits of the tank at a point between said positions.

7. In combination, a tank, a can therein, a hook secured to the bottom of the can, a stop secured to the bottom of the tank and arranged to limit the movement of the hook to a certain distance in a vertical direction and to a certain distance in a horizontal direction.

8. In an ice-making plant, a tank, a plurality of groups of cans located in said tank, a water supply, a connection between said supply and one of the groups of cans, means for simultaneously discharging a predetermined volume of water from said supply into each of the cans of the group, means for filling the tank with a freezing mixture during the filling of the cans with water from the water supply, the entire lower end of each can being exposed to the hydrostatic force of the freezing mixture.

9. In an ice-making plant, a tank, a plurality of groups of cans located in said tank, a water supply, means for causing said supply to pass in cold exchange relation with a spent thawing medium, a connection between said supply and one of the group of cans, means for simultaneously discharging a predetermined volume of water from said supply into each of the cans of the group, means for filling the tank with a freezing mixture during the filling of the cans with water for the water supply, the entire bottom surfaces of all the cans being exposed to the hydrostatic force of a contacting fluid.

10. In an ice-making plant, a tank arranged to contain brine of alternatingly freezing and melting temperatures, a can continuously in said tank at both said temperatures and having an aperture, an air pipe above said can, a flexible metal tube attached with one end to said pipe and with the other end to said aperture, and a guide on said can to hold said tube laterally beyond the outer face of the body of the can and to permit expansion and contraction of said tube independently of said can.

11. In an ice plant, a tank, cans arranged to remain therein during the operations of filling, freezing, thawing and ice removal, a mechanical coupling between the cans and the tank arranged to permit the free removal of the ice from the cans while the latter remain in the tank, an air line elevated with respect to said cans, a tube located upon the outside of a can and free to bend, expand and contract independently thereof, and a flexible connection between said air line and said tube.

12. In an ice making plant, a tank, a can within said tank, a relatively thick and a relatively thin air pipe, a flexible connection between said pipes, the thin pipe being rigidly connected to said can at spaced points so as to permit of a different expansion of said thin pipe and can, and a flexible connection between said can and tank.

13. In an ice-making plant, a tank, an overflow trough, a cold brine container, a warm brine container, a pipe from said cold brine container to said tank, a pump, a second pipe from said trough to said pump, a third pipe from said pump to said cold brine container, a fourth pipe from said warm brine container to said tank, a second pump, a fifth pipe from said tank to said second pump, a discharge pipe from said second pump to said trough, a spout in said discharge pipe communicating with said warm brine container, and a float valve controlling said spout and controlled in turn by the liquid in said warm brine container.

14. In an ice-making plant, a tank, an overflow trough, a cold brine container, a warm brine container, a pipe from said cold brine container to said tank, a valve in said pipe, a pump, a second pipe from said trough to said pump, a third pipe from said pump to said cold brine container, a fourth pipe from said warm brine container to said tank, a second pump, a fifth pipe from said tank to said second pump, a second valve in said fifth pipe, means for simultaneously operating said valve and said second valve, a discharge pipe from said second pump to said trough, a spout in said discharge pipe communicating with said warm brine container, a float valve controlling said spout and controlled in turn by the liquid in said warm brine container, and a branch pipe from said fifth pipe to said warm brine container.

15. In an ice-making plant, a tank, a can therein, circulating systems for selectively passing a freezing brine and a thawing brine through said tank in contact with said can and means in said circulating system for the thawing brine whereby the latter, after it has performed its function, is re-warmed to a degree at least partly compensating for the reduction of temperature in said thawing brine resulting from the thawing process a means for emptying the tank of the freezing brine prior to the introduction of the thawing brine.

16. In an ice-making plant, a tank, a can therein, circulating systems for selectively passing a freezing brine and a thawing brine through said tank in contact with said can, and a supply system whereby water to be converted into ice is supplied to said plant, said supply system, in part, being incorporated in the circulating system for the thawing brine whereby the latter after performing its function is re-warmed to a degree at least partly compensating for the loss of heat in said thawing brine due to the thawing process and said water is preliminarily cooled prior to being subjected to the action of the freezing brine, a means for emptying the tank of the freezing brine prior to the introduction of the thawing brine.

17. The process of making ice which consists in supplying water to be frozen to a container, circulating a freezing agent about said container to convert said water into ice, removing said freezing agent from about said container and substituting a circulation of warm brine to facilitate the removal of the ice from said container and then passing the warm brine into contact with the water supply to restore to said warm brine at least a portion of the heat lost in the performance of its operative functions.

18. The process of making ice which consists in supplying water to be frozen to a container, circulating a freezing agent about said container to convert said water into ice, then emptying the freezing agent from about said container and substituting a circulation of thawing agent and removing the ice from said container before said thawing agent has effected a perceptible change in the dimensions of the ice.

In testimony whereof I have hereunto set my hand.

RALPH HORTON.